2,823,552

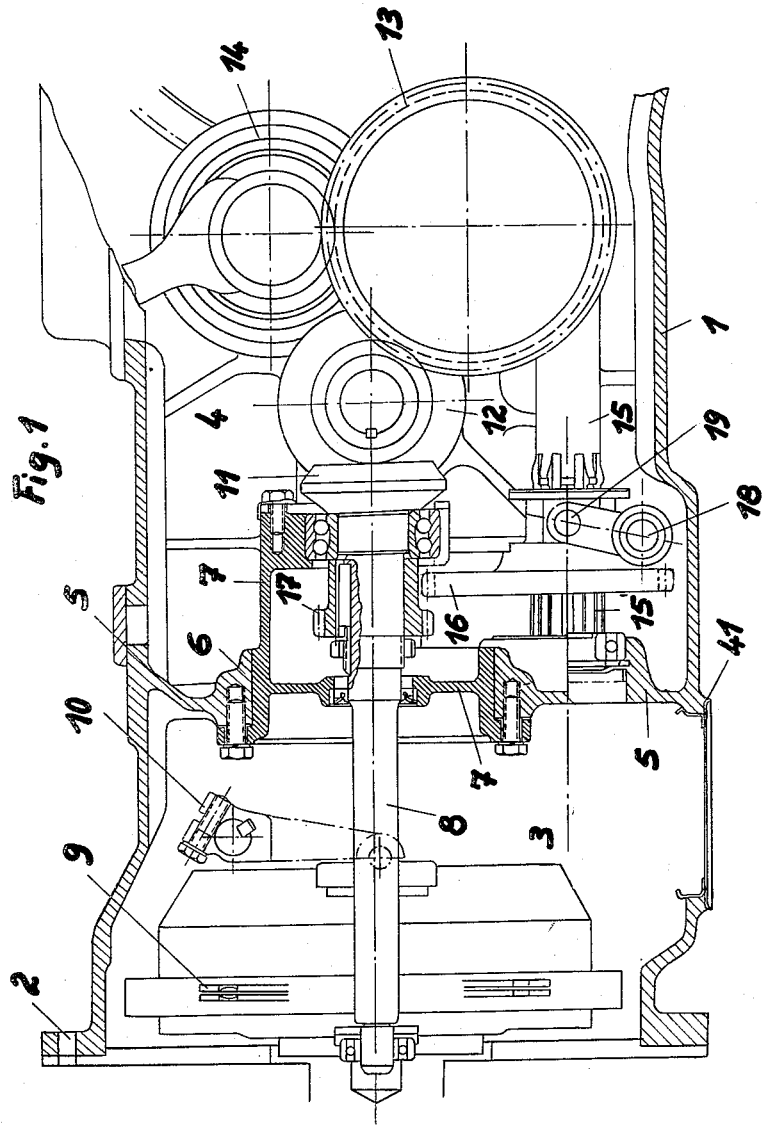

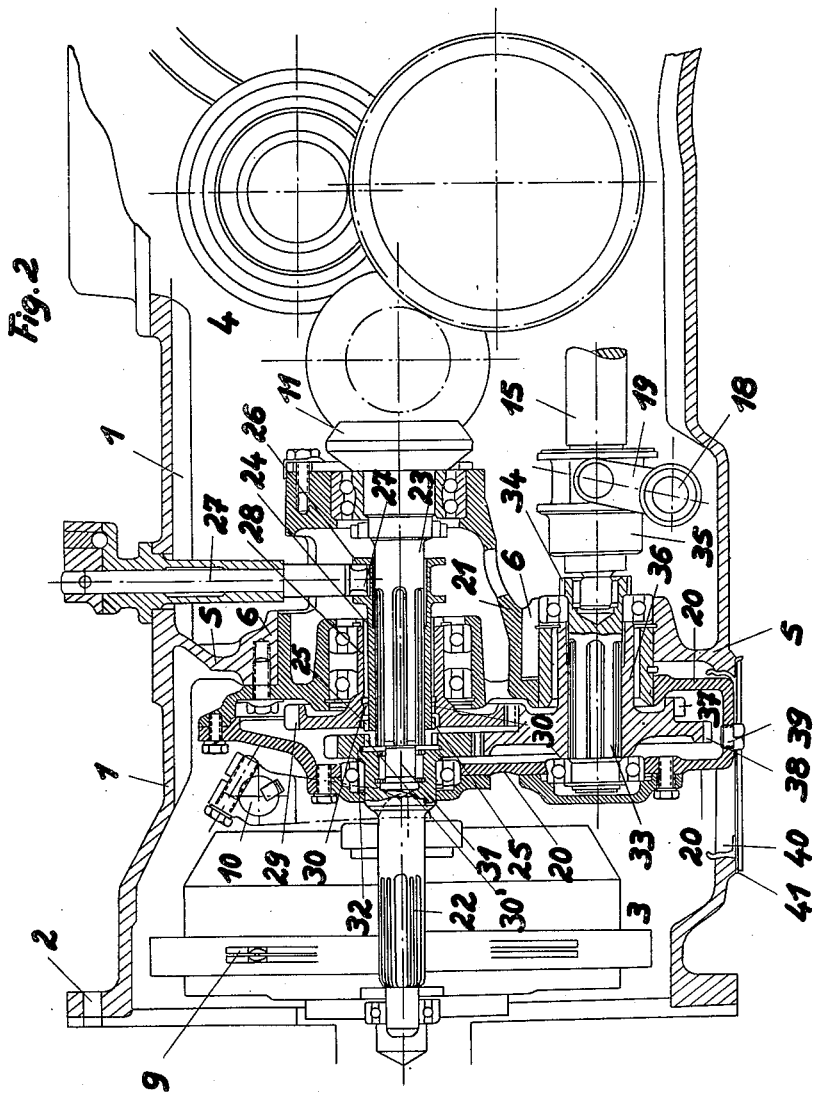

SPEED-CHANGE GEAR UNIT FOR MOTOR-VEHICLES, ESPECIALLY TRACTORS

Karl Haverlender, Hannover, Germany, assignor to Hannoversche Maschinenbau - Aktiengesellschaft vormals Georg Egestorff (Hanomag), Hannover-Linden, Germany, a German company Application December 18, 1952, Serial No. 326,627

7 Claims. (Cl. 74—15.66)

The present invention concerns a speed-change gear unit for motor-vehicles, especially tractors, fitted with a power take-off shaft for the operation of auxiliary equipment, such as agricultural machines, implements, or the like. Known gear units for tractors usually have a certain number of gear ratios which are applied as required when driving on roads or in the field. It has been found, however, that under certain soil conditions or working requirements the normally provided gear ratios do not suffice. With towed planting machines in particular a normal tractor is too fast.

It is one object of the present invention to design normal tractors so that afterwards they may be fitted with an additional reduction gearing or, if necessary, with an auxiliary over-drive. This makes it possible to attach planting machines to the tractor and operate them with normal power take-off speed.

The present invention is characterized by the fact that one part of the power take-off shaft forms a countershaft to give an additional gear ratio. For this purpose the power take-off shaft may consist of two parts which can be coupled together and of which that part forming the countershaft is provided with a further set of gears. On the other hand the gear housing of the tractor has been designed so that an auxiliary gear unit may be arranged in front of or behind the speed-change gear unit without alternating the gear housing itself. For this purpose that part of the gear unit situated opposite the clutch is set back so that a free space remains in the gear housing for subsequent fitting of an auxiliary gearing.

If the normal gear unit is to be supplemented the gear shaft arranged between clutch and gear unit will be replaced, together with its bearings, by the auxiliary gear unit which fits into the same mountings and which connects clutch and speed-change gear unit. Preferably the auxiliary gearing is arranged in the wall separating the clutch housing from the gear unit, simultaneously forming an oil seal in the wall. Furthermore the auxiliary gearing is fully enclosed in a housing which also contains the lubricating oil. To secure easy accessibility for the auxiliary gearing, for instance for draining off the oil, the housing for the speed-change gear unit is at its bottom provided with an opening which may be closed by a cover or the like.

The auxiliary gearing may be applied in various normal gear units and such normal gear unit may be provided either on a tractor or on another suitable motor vehicle.

The invention will be described further, by way of example with reference to the accompanying drawings, in which:

Fig. 1 is a longitudinal section through that part of the gear unit leading towards the clutch; and Fig. 2 is a sectional view through the same part of the gear unit after the auxiliary gearing has been fitted.

A gear box 1 is attachable to the engine block by means of a flange 2 and thus forms a clutch housing 3 and a gear casing 4, which are separated from each other by a wall 5. In its centre this wall is provided with a bearing housing 6 for a bearing cage 7 in which a gear shaft 8 is mounted.

The clutch 9 with its actuating mechanism 10 is situated within the housing 3 and on the shaft 8. At its other end shaft 8 is fitted with a bevel gear 11 which is in engagement with gears 12, 13, 14, etc. The gearing 12, 13, 14 is shifted by means of a gear shift lever in the usual way, thus giving different gear ratios. Below the gear shaft 8 a power take-off shaft 15 is arranged lengthwise from end to end of the gear box 1, and this power take-off shaft is supported at one end in the wall 5. On a part 15′ of the power take-off shaft 15 a sliding spur gear 16 is fitted which in its end position is in engagement with a counter gear 17 on the shaft 8. By means of a control shaft 18 and a gear shift lever 19 the spur gear 16 may be moved and thus the power take-off shaft 15 is engaged or disengaged.

If an additional gear ratio is to be provided the bearing 7 with the gear shaft 8 is removed from bearing housing 6 and an additional gearing is enclosed by a housing 20 (Fig. 2) forming a bearing 21 which exactly fits into bearing housing 6. Thus the oil-sealing wall separating the gear housing 4 and the clutch housing 3 is again restored. Within the housing 20 and the bearing 21 respectively, two shaft ends 22 and 23 are arranged which may be coupled together and of which the shaft end 22 fits into the clutch, whilst that part of the shaft 23 protruding from bearing 21 is provided with a bevel gear 11, which is in engagement with the other gears in the usual manner. A coupling bush 24 is slidable along the shaft 23, and has at its front end a coupling dog 25 or, as the case may be, a suitable tooth system and at its rear end a collar 26 into which fits gear shift lever 27 for the auxiliary gear unit. The bush 24 is provided with a freely rotating spur gear 29 with a guide 28 and which also has a tooth system 30 corresponding to the coupling dog or tooth system 25. Furthermore the shaft 23 has at its end a bearing pivot 31 which provides bearing support for this shaft in the shaft 22. The shaft 22 has a tooth system 32, acting as a pinion which on its inner periphery is provided with a further tooth system 30′. Below the shafts 22 and 23 a countershaft 33 is arranged in the housing 20, forming one part of the power take-off shaft and being provided with a coupling 34 at its end which may be engaged with a coupling 35 on the part 15 of the power take-off shaft by means of the shift lever 19.

The countershaft 33 is fitted with a bush 36 which is provided with two gears 37 and 38 which are respectively engaged with the spur gears 29 and 32.

At the bottom of the housing 20 there is an oil drain which passes through an opening 40 in the gear box 1. The opening 40 is normally closed by means of a suitable cover 41.

When installing the auxiliary gear unit illustrated in Fig. 2, the shifting mechanism 27 has to be installed in the gear box 1 in addition to the unit itself. In the appropriate position of the shifting mechanism, the drive is from the clutch 9 through the shaft 22 to the shaft 23 when the coupling 25/30′ is engaged. Thus the auxiliary gearing is left out. Gears 38, 37 and 29 are idling when parts 15 and 33 of the power take-off shaft are not coupled with each other by means of coupling 34/35 and when the power take-off shaft is not driven.

If the auxiliary gear unit is to be engaged the position of the shift lever 27 has to be changed so that the parts 25 and 30 are coupled together. In this position the drive is from the clutch 9 through the shaft 22 and gears 32, 38, 37 and 29, to the shaft 23 and from there to the normal gear unit.

With the auxiliary gear unit of the present invention different additional gear ratios may be obtained, including a special low gear as well as a special high gear.

The unit is suitable for all kinds of motor vehicles.

I claim:

1. In a tractor, a driving arrangement comprising in combination, a housing containing a clutch mechanism and a main gear mechanism spaced from each other; an auxiliary gear casing removably mounted in said housing between said clutch and main gear mechanisms and having a wall dividing said housing into a clutch chamber and an oil-tight gear chamber; a main driving shaft in said housing rotatably mounted in said wall of said auxiliary gear casing; a main driven shaft arranged coaxial with said main driving shaft and connected to said main gear mechanism; an intermediate shaft arranged in said auxiliary gear casing rotatably mounted at one end in said wall thereof and being parallel to said main driving and driven shafts; a take-off shaft arranged coaxial with said intermediate shaft; disengageable coupling means between said take-off shaft and said intermediate shaft; first gear means non-rotatably mounted on said driving shaft in said auxiliary gear casing; second gear means non-rotatably mounted on said intermediate shaft in said auxiliary gear casing and meshing with said first gear means for permanently driving said intermediate shaft; third gear means non-rotatably mounted on said intermediate shaft in said auxiliary gear casing; fourth gear means rotatably mounted in said auxiliary gear casing on said main driven shaft and permanently engaging said third gear means; and coupling means for selectively coupling said main driven shaft to said first gear means and said fourth gear means, respectively.

2. In a tractor, a driving arrangement comprising in combination, a housing containing a clutch mechanism and a main gear mechanism spaced from each other; a substantially oil-tight auxiliary gear casing removably mounted in said housing between said clutch and main gear mechanisms and having a wall dividing said housing into a clutch chamber and an oil-tight gear chamber, said auxiliary gear casing having oil drain means provided at the bottom thereof; a main driving shaft in said housing rotatably mounted in said wall of said auxiliary gear casing; a main driven shaft arranged coaxial with said main driving shaft and connected to said main gear mechanism; an intermediate shaft arranged in said auxiliary gear casing rotatably mounted at one end in said wall thereof and being parallel to said main driving and driven shafts; a take-off shaft arranged coaxial with said intermediate shaft; disengageable coupling means between said take-off shaft and said intermediate shaft; first gear means non-rotatably mounted on said driving shaft in said auxiliary gear casing; second gear means non-rotatably mounted on said intermediate shaft in said auxiliary gear casing and meshing with said first gear means for permanently driving said intermediate shaft; third gear means non-rotatably mounted on said intermediate shaft in said auxiliary gear casing; fourth gear means rotatably mounted in said auxiliary gear casing on said main driven shaft and permanently engaging said third gear means; and coupling means for selectively coupling said main driven shaft to said first gear means and said fourth gear means, respectively.

3. In a tractor, a driving arrangeent comprising in combination, a housing containing a clutch mechanism and a main gear mechanism spaced from each other; an auxiliary gear casing removably mounted in said housing between said clutch and main gear mechanisms and having a wall dividing said housing into a clutch chamber and an oil-tight gear chamber; a main driving shaft in said housing rotatably mounted in said wall of said auxiliary gear casing; a main driven shaft arranged coaxial with said main driving shaft and connected to said main gear mechanism; and intermediate shaft arranged in said auxiliary gear casing rotatably mounted at one end in said wall thereof and being parallel to said main driving and driven shafts; a take-off shaft arranged coaxial with said intermediate shaft; disengageable coupling means between said take-off shaft and said intermediate shaft; first gear means non-rotatably mounted on said driving shaft in said auxiliary gear casing; second gear means non-rotatably mounted on said intermediate shaft in said auxiliary gear casing and meshing with said first gear means for permanently driving said intermediate shaft; third gear means integral with and of smaller diameter than said second gear means non-rotatably mounted on said intermediate shaft in said auxiliary gear casing; fourth gear means of larger diameter than said first gear means rotatably mounted in said auxiliary gear casing on said main driven shaft and permanently engaging said third gear means; and coupling means for selectively coupling said main driven shaft to said first gear means and said fourth gear means, respectively.

4. In a tractor, a driving arrangement comprising, in combination, a housing containing a clutch mechanism and a main gear mechanism spaced from each other and having a transverse wall formed with an opening therethrough, said transverse wall dividing said housing into a clutch chamber and an oil-tight gear chamber; a substantially oil-tight auxiliary gear casing removably mounted in said opening of said transverse wall and having a wall portion closing said opening and forming an oil-seal between said clutch chamber and said gear chamber, said gear casing having oil drain means provided at the bottom thereof; a main drive shaft in said housing rotatably mounted in said wall portion of said auxiliary gear casing; a main driven shaft arranged coaxially with said main drive shaft and connected to said main gear mechanism; an intermediate shaft arranged in said auxiliary gear casing rotatably mounted at one end in said wall portion thereof and being parallel to said main driving and driven shafts; a first pinion fixedly mounted on said driving shaft in said auxiliary gear casing; a second pinion rotatably mounted in said auxiliary casing on said driven shaft; a compound gear wheel fixedly mounted on said intermediate shaft and permanently engaging said first and second pinions; and coupling means for selectively coupling said drive shaft to said driven shaft and said second pinion to said driven shaft, respectively, so that said driven shaft is either driven directly from said drive shaft or driven from said drive shaft over said first pinion, said compound gear wheel and said second pinion.

5. In a tractor, a driving arrangement comprising, in combination, a housing containing a clutch mechanism and a main gear mechanism spaced from each other and having a transverse wall formed with an opening therethrough, said transverse wall dividing said housing into a clutch chamber and an oil-tight gear chamber; a substantially oil-tight auxiliary gear casing removably mounted in said opening of said transverse wall and having a wall portion closing said opening and forming an oil-seal between said clutch chamber and said gear chamber, said gear casing having oil drain means provided at the bottom thereof; a main drive shaft in said housing rotatably mounted in said wall portion of said auxiliary gear casing; a main driven shaft arranged coaxially with said main drive shaft and connected to said main gear mechanism; an intermediate shaft arranged in said auxiliary gear casing rotatably mounted at one end in said wall portion thereof and being parallel to said main driving and driven shafts; a first pinion fixedly mounted on said driving shaft in said auxiliary gear casing; a second pinion rotatably mounted in said auxiliary casing on said driven shaft and having a diameter larger than said first pinion; a compound gear wheel fixedly mounted on said intermediate shaft and permanently engaging said first and second pinions; and a claw coupling mounted on a splined portion of said driven shaft for sliding motion between a first position in which said claw coupling engages said driving shaft so that said driven shaft is directly driven by said driving shaft and a second position in which said claw coupling engages said second pinion so that said second pinion is non-rotatably coupled to said driven shaft and said driven shaft is driven from said driving shaft over said first pinion, said compound gear wheel on said auxiliary shaft, and said second pinion with a rotary speed slower than the rotary speed of said driving shaft.

6. In a tractor, a driving arrangement comprising, in combination, a housing containing a clutch mechanism and a main gear mechanism spaced from each other and having a transverse wall formed with an opening therethrough, said transverse wall dividing said housing into a clutch chamber and an oil-tight gear chamber; a substantially oil-tight auxiliary gear casing removably mounted in said opening of said transverse wall and having a wall portion closing said opening and forming an oil-seal between said clutch chamber and said gear chamber, said gear casing having oil drain means provided at the bottom thereof; a main drive shaft in said housing rotatably mounted in said wall portion of said auxiliary gear casing; a main driven shaft arranged coaxially with said main drive shaft and connected to said main gear mechanism; an intermediate shaft arranged in said auxiliary gear casing rotatably mounted at one end in said wall portion thereof and being parallel to said main driving and driven shafts; a first pinion fixedly mounted on said driving shaft in said auxiliary gear casing; a second pinion rotatably mounted in said auxiliary casing on said driven shaft and having a diameter larger than said first pinion; a compound gear wheel fixedly mounted on said intermediate shaft and permanently engaging said first and second pinions; a claw coupling mounted on a splined portion of said driven shaft for sliding motion between a first position in which said claw coupling engages said driving shaft so that said driven shaft is directly driven by said driving shaft and a second position in which said claw coupling engages said second pinion so that said second pinion is non-rotatably coupled to said driven shaft and side driven shaft is driven from said driving shaft over said first pinion, said compound gear wheel on said auxiliary shaft, and said second pinion with a rotary speed slower than the rotary speed of said driving shaft; and shifting means operatively connected to said claw coupling for moving said claw coupling between said first and second positions thereof.

7. In a tractor, a driving arrangement, comprising, in combination, a housing containing a clutch mechanism and a main gear mechanism spaced from each other and having a transverse wall formed with an opening therethrough, said transverse wall dividing said housing into a clutch chamber and an oil-tight gear chamber; a substantially oil-tight auxiliary gear casing removably mounted in said opening of said transverse wall and having a wall portion closing said opening and forming an oil-seal between said clutch chamber and said gear chamber, said gear casing having oil drain means provided at the bottom thereof; a main drive shaft in said housing rotatably mounted in said wall portion of said auxiliary gear casing; a main driven shaft arranged coaxially with said main drive shaft and connected to said main gear mechanism; an intermediate shaft arranged in said auxiliary gear casing rotatably mounted at one end in said wall portion thereof and being parallel to said main driving and driven shafts; a first pinion fixedly mounted on said driving shaft in said auxiliary gear casing; a second pinion rotatably mounted in said auxiliary casing on said driven shaft; a compound gear wheel fixedly mounted on said intermediate shaft and permanently engaging said first and second pinions; coupling means for selectively coupling said drive shaft to said driven shaft and said second pinion to said driven shaft, respectively, so that said driven shaft is either driven directly from said drive shaft or driven from said drive shaft over said first pinion, said compound gear wheel and said second pinion; a take-off shaft arranged coaxial with said intermediate shaft; and disengageable coupling means between said take-off shaft and said intermediate shaft.

References Cited in the file of this patent

UNITED STATES PATENTS

| | | |
|---|---|---|
| 2,334,958 | Rohkor | Nov. 23, 1943 |
| 2,347,352 | Lapsley | Apr. 25, 1944 |
| 2,464,479 | Avila | Mar. 15, 1949 |
| 2,506,671 | Jacobi | May 9, 1950 |
| 2,633,759 | Warsaw | Apr. 7, 1953 |